April 20, 1926.
H. J. PUMPHREY, JR
1,581,320
ELECTRIC AIR PRESSURE INDICATOR FOR PNEUMATIC TIRES
Filed Dec. 26, 1924
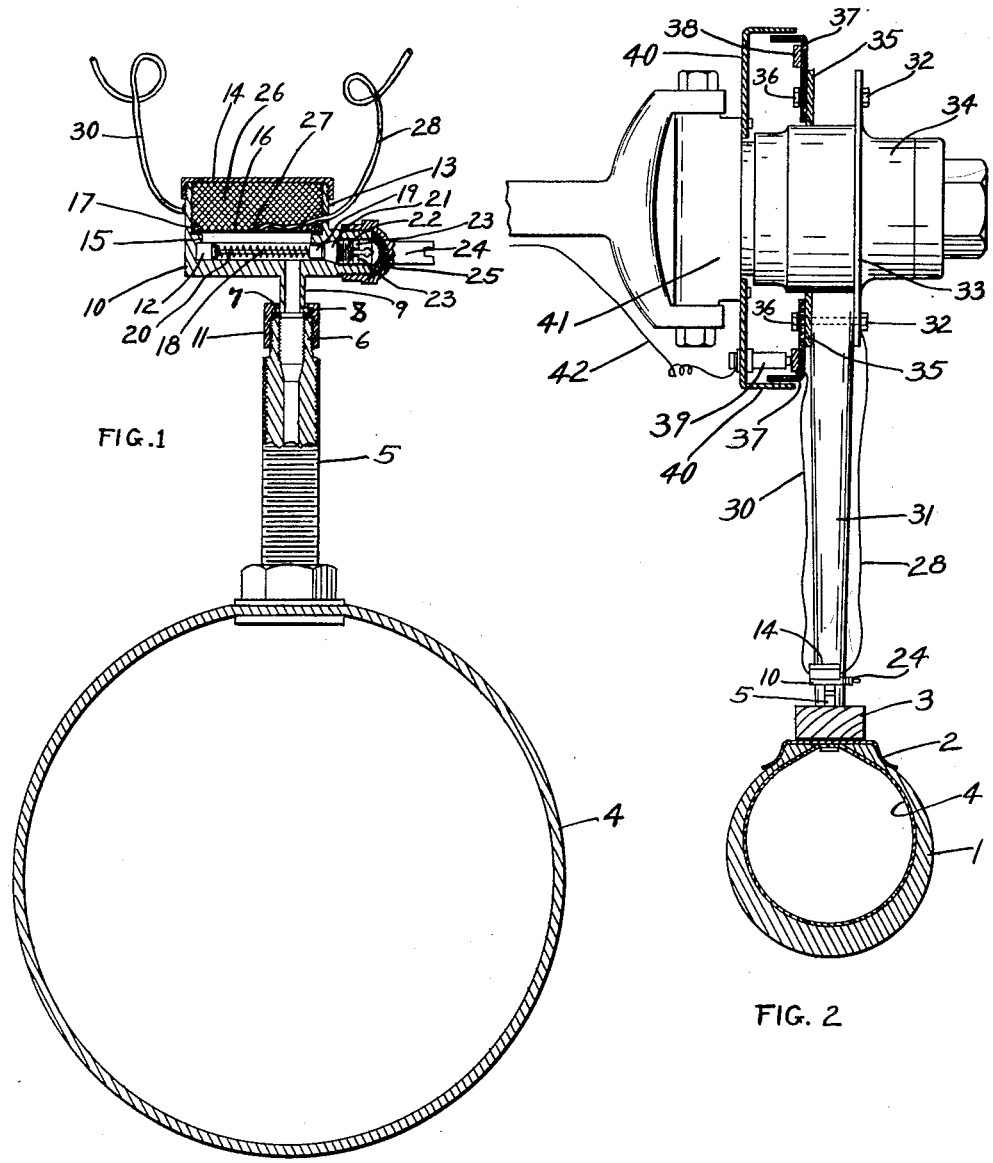
INVENTOR,
Homer J. Pumphrey Jr.
BY
Howard P. Smith
ATTORNEY Patented Apr. 20, 1926.

1,581,320

UNITED STATES PATENT OFFICE.

HOMER J. PUMPHREY, JR., OF CLAYTON, OHIO.

ELECTRIC AIR-PRESSURE INDICATOR FOR PNEUMATIC TIRES.

Application filed December 26, 1924. Serial No. 758,192.

*To all whom it may concern:*

Be it known that I, HOMER J. PUMPHREY, Jr., a citizen of the United States, residing at Clayton, in the county of Montgomery and State of Ohio, have invented certain new and useful Improvements in Electric Air-Pressure Indicators for Pneumatic Tires, of which the following is a specification.

This invention relates to new and useful improvements in electric air-pressure indicators for pneumatic tires.

It is the principal object of my invention to provide for indicating the air-pressure in the pneumatic tires of an automobile, and more particularly when the machine is in motion, electric means which are delicately responsive to the increase and decrease of air-pressure in each tire. These means preferably comprise an indicator whose movement is controlled by an electric current which passes through a circuit in which a variable resistance, such as enclosed graphite particles, is placed. When the air pressure in a tire increases, the graphic particles will be compressed by a diaphragm against which said pressure acts, to decrease the resistance in the electric circuit, thereby permitting more current to flow through it to move the indicator a greater distance. But when the pressure of the air in the tire decreases, the graphite particles will be permitted by the diaphragm to spread apart to increase their resistance to the flow of electric current to the indicator operating mechanism, causing the indicator to be moved back for the purpose of registering opposite the scale the decreasing air-pressure in the tire.

It is another object of my invention to provide selective means whereby, when the automobile is in motion, the indicator operating mechanism may be placed in circuit with the air-pressure determining means for a particular tire; and thereafter quickly switched to the air-pressure ascertaining means for another tire. It is thus possible for the driver of a machine at any time, quickly and conveniently, to ascertain the air-pressure in one or all of his tires without stopping it and getting out to test a tire or tires with the ordinary gage.

Other important and incidental objects will be brought out in the following specification and particularly set forth in the subjoined claims.

In the accompanying drawings illustrating my invention, Figure 1 is a longitudinal, sectional view taken through my electric air-pressure determining means for a pneumatic tire, which is shown in cross section. Figure 2 is a front view, partly in section, of a portion of an automobile wheel, showing how my air-pressure determining means are attached thereto. And Figure 3 is a diagram of the wiring of my device.

Referring to the accompanying drawings for a detailed description of my invention, the numeral 1 designates the outer casing of a pneumatic tire mounted on a rim 2 applied to the felloe 3 of an automobile wheel. Within the casing 1 is an inner tube 4 having a valve stem 5 formed with an outer reduced threaded end 6. Seated against the outer end of the latter is a disc 7 preferably constructed of rubber and having a central hole over the hole in the valve stem 5. Adapted to engage the outer surface of the disc 7 is a shoulder 8 formed on the outer end of a right-angled tubular projection 9 on a horizontal valve casing 10. Fitted on this tubular projection 9 of the valve casing, is a sleeve cap 11 which is internally threaded so that it may be screwed down upon the reduced exteriorly threaded end 6 of the valve stem to couple the latter, in an air-tight manner, to the tubular projection. (See Figure 1.)

The horizontal valve casing 10 is formed with an axle bore 12, and has, between its inner end and a point near its outer end, a right-angled hollow cylindrical extension 13 which is externally threaded to receive a cap 14. Formed within the casing 10 at the base of its cylindrical extension 13, which is internally threaded, is an annular ledge 15 against which a flexible diaphragm, preferably constructed of rubber, is pressed by an externally threaded ring 17 when the latter is screwed down within the said extension 13.

Disposed below the diaphragm 16 within the casing bore 12, which is open to the tubular projection 9 below it and to the space above it, is a horizontally disposed inner tire valve 18 of a common type. This valve has a rubber closure piece 19 on the outer end of a valve rod 20, and is movable to bring this closure piece against a seat which is formed between the annular ledge 15 in the casing and the bottom of the latter, to seal the bore 12 against the escape of air from the interior of the casing. (See Figure 1.)

Loosely surrounding the valve rod 20 in the outer end of the bore 12, which is enlarged is a beveled piece 21 preferably constructed of rubber that is tightly fitted against the wall of the bore, which at this point tapers outwardly. This closure piece 21 is tightly pressed into this tapered portion of the bore 12, which is also threaded, by an externally threaded cylindrical member 22 which also loosely surrounds the valve rod 20 and is formed on its outer end with flattened projections 23, 23 that are adapted to be engaged by the reverse recessed end of a dust cap 24 to turn it. The dust cap 24 is screwed on the outer end of the casing 10, which is cylindrical, against a flexible washer 25 to tightly seal the outer end of the bore 12 against the entrance of dust and the escape of air. (See Figure 1.)

When it is desired to inflate the inner tube 4, the dust cap 24 is removed, after which an air-hose (not shown) is connected to the outer end of the casing 10 in the usual manner. The air, under pressure, will pass between the valve rod and the inner surfaces of the members 22 and 21 which loosely surround it, to exert an inward pressure upon the closure piece 19, which will thereby be moved a sufficient distance inwardly to admit the air into the interior of the valve casing 10, from whence it will pass through the tubular projection 9 thereof, into and through the valve stem 5 into the tire 4. (See Figure 1.)

The hollow cylindrical extension 13 of the valve casing 10 between its cover 14 and the diaphragm 16, is filled with a granular conducting material such as graphite 26. Secured to the center of the diaphragm 16 is a contact button 27 which is preferably made of brass and which is at all times in contact with the graphite particles 26. Secured to the contact button 27 is one end of an insulated wire 28 which enters the valve casing 10 through a hole in one side of its cylindrical portion 13. Secured to the contact button 29 on the other side of said cylindrical extension 13, is one end of an insulated wire 30. (See Figure 1.)

The wires 28 and 30 run along a spoke 31 of the automobile wheel to the hub portion of the latter. (See Figure 2.) The wire 28 is connected at its upper end to one of a number of bolts 32 which secure to the front portions of the spokes 31, a flange plate 33 that is fitted on the front part of the hub 34 of the wheel.

Mounted on the hub 34 at the rear of the spokes 31 of the automobile wheel, and secured thereto by the bolts 32, is a rear flange plate 35. (See Figure 2.) Surrounding the hub 34 behind the plate 35, and secured thereto by bolts 32 and nuts 36, is an inwardly turned cupped member 37 preferably constructed of insulating material such as bakelite.

Suitably secured to the inner face of the member 37 is a ring 38 preferably constructed of metal of good conductivity, to which the inner end of the wire 30 is connected. In continuous engagement with the ring 38 when the latter is turned by the hub 34, is a stationary brush 39 that is preferably constructed of carbon and which is secured to an outwardly facing cupped member 40 preferably constructed of insulating material and firmly secured to the steering knuckle 41. The cupped member 40 is of greater diameter than the cupped member 37 to permit the latter to turn freely within its flanged portion, which protects the brush and ring against the entrance of dust and dirt.

Connected to the inner end of the stationary brush 39 is a wire 42 which is a practical extension of the wire 30. This wire 42 leads to a contact 43 of an electric switch shown in diagram in Figure 3. There are as many contacts 43 in this switch as there are tires, plus one which acts as a neutral point for the switch arm 44. This switch arm is mounted on a shaft 45 which is connected by a wire 46 with a milliammeter indicator 47 of a common type that is provided with a scale 48 that is preferably calibrated in five pound graduations. From this indicator 47 a wire 49 runs to a storage battery 50 which is grounded to the frame of the automobile by a wire 51. The wire 28 is also grounded to the frame of the machine through its connection with one of the bolts 32 that contacts with the hub flange plate 33.

When the switch arm 44 is moved by the driver to the contact 43 for a particular tire, the electric indicator 47 will be placed in the electric circuit which contains the air-pressure determining means for that tire. Let it be assumed that the switch arm 44 is in engagement with the contact 43 which is connected by the wire 42 to the brush 39 belonging to the automobile wheel carrying the air-pressure determining means previously described, and which are the same as the means carried by the other wheels. After the tire 4 has been inflated and the valve 19 has resumed its closure position in the bore 12 of the casing 10, the pressure of the air in the tire will act upon the diaphragm to press it against the graphite particles 26 to compress them within the cylindrical extension 13 of the casing; and in proportion as they are compressed, their resistance will be lessened to the flow of electric current through them. Therefore, since they bridge the space between the contact button 27 on the diaphragm and the contact button 29 on the wall of the casing, the resistance which they offer to the passage of electric current will be reflected by the movement of the indicator pointer 52 in the indicator 47.

When the pressure of the air in the tire decreases, the flexible diaphragm will be permitted to move inwardly to its normal state, thereby allowing the graphite particles to spread out. Their resistance to the flow of electric current from the contact button 27 on the diaphragm to the contact button 29 on the wall of the casing will then become greater, causing the pointer 52 to fall back or retreat and thus to indicate on the scale 48 a gradually decreasing air-pressure in the tire. It is thus seen that the movement of the pointer 52 will be responsive at all times to the air-pressure in the tire whose resistance means is in circuit with the indicator 47 which contains it.

The indicator 47 may be secured in an automobile in front of the driver for visibility at all times, so that by turning the switch arm 44 to the contact 43 for a particular tire, he may immediately determine from the position of the pointer 52 with respect to the scale 48, the air-pressure in that tire without stopping the machine to test it in the ordinary manner.

Having described my invention, I claim:

1. A pressure controlled rheostat comprising an elongated tubular casing formed at one end with a valve-containing portion that is open to the atmosphere, a valve in said portion of the casing, a raised hollow extension on said tubular casing between its valve containing portion and its other end, a flexible diaphragm within said hollow extension of the tubular casing for exposure to the air within the latter, an electric circuit, and a variable resistance included in said electric circuit within the hollow extension of the casing for compression by said diaphragm when the latter is forced outwardly by air pressure.

2. A pressure controlled rheostat comprising an elongated tubular casing formed at one end with a valve-containing portion that is open to the atmosphere, a valve in said portion of the casing, a raised hollow extension on said tubular casing between its valve containing portion and its other end, a flexible diaphragm at the base of said hollow extension of the tubular casing for exposure to air in the latter, an electric circuit, and electric current carrying particles included in said electric circuit and adapted to be compressed within the hollow extension of the tubular casing by the diaphragm when the latter is forced outwardly by the pressure of the air within said casing.

In testimony whereof I have hereunto set my hand this 23rd day of December, 1924.

HOMER J. PUMPHREY, Jr.